United States Patent [19]
Fletcher et al.

[11] 3,851,238
[45] Nov. 26, 1974

[54] PHASE-LOCKED SERVO SYSTEM

[76] Inventors: James C. Fletcher, Administrator of the National Aeronautics and Space Administration with respect to an invention by; Clifford Burdin, Omaha, Nebr.

[22] Filed: Oct. 26, 1973

[21] Appl. No.: 409,991

[52] U.S. Cl. .................. 318/649, 318/608, 318/640, 318/675
[51] Int. Cl. ............................................. H02p 5/46
[58] Field of Search ........... 318/648, 649, 640, 608, 318/618, 675

[56] References Cited
UNITED STATES PATENTS

| | | | |
|---|---|---|---|
| 2,586,817 | 2/1952 | Harris, Jr. ......................... | 318/648 |
| 2,683,247 | 7/1954 | Wiley ................................ | 318/648 |
| 3,398,341 | 8/1968 | Dooley et al. .................... | 318/649 |
| 3,470,429 | 9/1969 | Goodwin et al. .................. | 318/649 |

*Primary Examiner*—B. Dobeck
*Attorney, Agent, or Firm*—Wayland H. Riggins; L. D. Wofford, Jr.; John R. Manning

[57] ABSTRACT

A phase lock servo system for synchronizing the rotation of a slip ring assembly with the rotation of an air bearing table so that a minimum of torque will be imparted through cables extending from the slip ring assembly to the air bearing table as such is rotated. The system includes two servo loops. The first servo loop includes a rate gyroscope carried on the air bearing table which generates a signal through a summing junction to be compared with a signal coming from a tachometer coupled to the slip ring assembly. The corrective signal is applied to a torque motor for rotating the slip ring assembly. The second servo loop includes a pair of photo detector cells which generate pulses responsive to the rotation of the air bearing table and slip ring assembly which are fed through a phase detector, and a variable gain amplifier to the summing junction circuit to provide a fine adjustment for rotating the slip ring assembly.

6 Claims, 3 Drawing Figures

3,851,238

PHASE-LOCKED SERVO SYSTEM

ORIGIN OF THE INVENTION

The invention described herein was made in the performance of work under a NASA Contract, and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to a phase lock servo system, and more particularly to a phase lock servo system which includes two servo loops, one for making a coarse adjustment and the other for producing a fine adjustment for synchronizing the rotation of a slip ring assembly with an air bearing table.

Heretofore, the slaving of one rotating body to another has usually been accomplished by utilizing a mechanical means for measuring the rotation of the master system and generating a signal to control the slave system so that such is rotated at the same rate. These systems are not practical for use in extremely sensitive situations, such as when it is desired to simulate zero gravity conditions.

In order to simulate outer space conditions for testing, various components, such as small rocket engines, gyroscope sensors, etc., a table mounted on air bearings is utilized. When the rockets being tested are fired such causes the table to rotate. If conventional wiring were used to supply energy to the components on the table, the torque produced by the wires twisting would interfere with the tests. While the wires can be coupled to the table through various slip ring assemblies, which includes brushes, such is still not completely satisfactory due to the frictional contact between the brushes and the slip ring assembly.

SUMMARY OF THE INVENTION

The invention provides a system for accurately synchronizing a slip ring assembly with an air bearing table so that wires can extend from the slip ring assembly to the air bearing table for supplying power to components carried thereon, without imparting torque to the table. The system includes a rate gyroscope which is carried on the air bearing table for generating an electrical signal indicative of the rotation of the table. The signal from the rate gyro circuit is fed to a summing junction circuit to be compared with a signal being produced by a tachometer coupled to the slip ring assembly. The summing junction circuit produces a corrective signal which is fed to a torque motor for rotating the slip ring assembly substantially at the same rate that the air bearing table is rotated. In order to more accurately synchronize the rotation of the slip ring assembly with the air bearing table, a phase lock servo system is utilized in conjunction with the normal servo system. The phase locked servo system includes a pair of photo detectors which produce pulses responsive to the rotation of the air bearing table and the slip ring assembly. The pulses from these photo detectors are fed into a phase detector which generates an analog signal indicative of the phase difference between the two pulses. This analog signal is fed through a variable gain amplifier to the summing junction circuit for providing a more accurate corrective signal to the torque motor. The output from the rate gyroscope is also fed to the variable gain amplifier to vary the gain of the amplifier.

Accordingly, it is an important object of the present invention to provide a servo system which is extremely accurate.

Another important object of the present invention is to add a phase locked servo loop to a conventional servo loop being utilized for synchronizing one rotating member with another so as to produce accurate slaving therebetween.

Still another important object of the present invention is to provide a system for supplying electrical power to a rotating member without imparting torque thereto.

These and other objects and advantages of the invention will become apparent upon reference to the following specification, attendant claims and drawings.

DESCRIPTION OF THE PREFERRED EMBODIMENT

Figure 1:
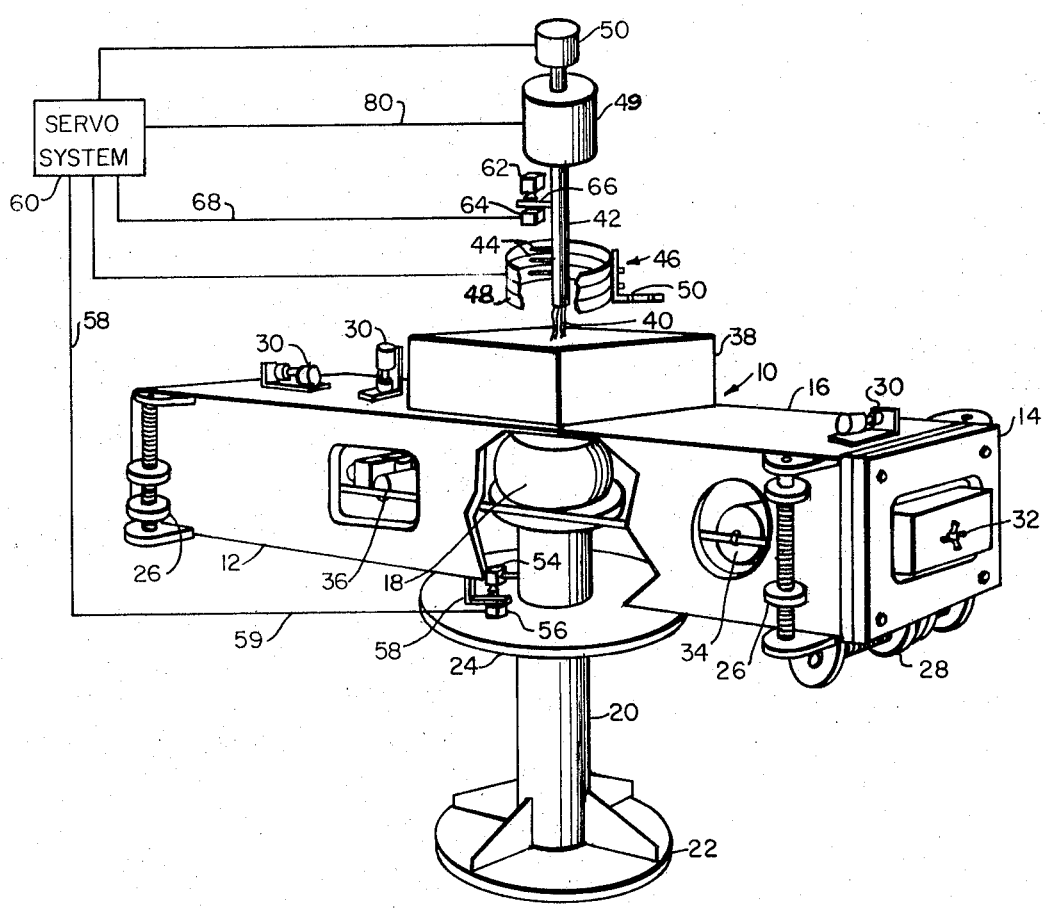
FIG. 1 is a perspective view, with parts broken away, for purposes of clarity and parts shown diagramatically of an air bearing table being supplied with power from a slip ring assembly.

Referring in more detail to FIG. 1 of the drawings, there is illustrated an air bearing table, generally designated by the reference character 10 which has side walls 12 joined by end walls 14 and a top 16. The table is supported on a conventional air bearing assembly 18 carried on top of an upright stand 20. The stand has an enlarged circular base portion 22 and a circular platform 24 spaced upwardly therefrom. The table is adapted to accommodate adjustable weights 26 and 28 which are used for balancing the table. Fine weight adjustments 30 are carried on top of the table. The details of the table will not be described, since such is conventional and the invention can be used in connection with supplying power to any type of rotating element.

Positioned in and on the table are various components that are to be tested, such as reaction jets 32 carried on the end wall 14, and a gas supply 34 for the reaction jets suitably mounted on the inside thereof. A rate gyroscope 36 is mounted by any suitable means within the table so as to sense the rotation of the table. A rectangular shaped housing 38 is carried on top of the table 10 for housing various components. This rate gyroscope supplies signals over some of the wires 40 extending upwardly therefrom through a tubular shaft 42 to brushes 44 forming part of a slip ring assembly, generally designated by the reference character 46. Outer rings 78 of the slip ring assembly are shown schematically as being fixed to a bracket which can be suitably attached to any support member. Electrical signals and power pass through the outer rings 48, the brushes 44, the wires 40 to the various components of the air bearing table 10. Electrical power and signals can be taken from and supplied to the outer rings 48 of the slip ring assembly by any suitable conductors (not shown).

In order to prevent unwanted torque from being imparted to the table 10 through the wires 40, it is necessary to rotate the wires, which are carried in the shaft 42, at the exact speed that the table is rotating. If the table were permitted to rotate at a different speed from the wires 40, they would twist and impart torque thereto, interferring with the simulation of outer space conditions.

Therefore, the shaft 42 of the slip ring assembly 46, is driven by a torque motor 49. Positioned on the same shaft 42 extending through the torque motor 49 is an electrical tachometer 50, which generates a signal indicative of the rate of rotation of the shaft 42.

Additional sensing devices are provided for sensing the rotation of the shaft 42 and the air bearing table 10 so as to produce a more accurate corrective signal. Mounted on the column 20 is a light source 54 which has spaced therefrom a photo-detector 56. An L-shaped bracket 58 is carried by the table 10 for interrupting this light source each time the table rotates thereby. When the light source 54 is interrupted a pulse is generated by the photo-detector cell 56 and fed over line 59 to a servo system 60. A similar photo detector is provided for sensing the rotation of the shaft 42 and includes a light source 62 spaced from a photo detector 64. A pulse is produced by the photo-detector 64 each time an outwardly extending arm 66 carried by the rotating shaft 42 interrupts the light beam. These pulses are fed over lead 68 to the servo system. The light source 62 and the photo-detector 64 can be mounted on any suitable bracket (not shown).

Figure 2:
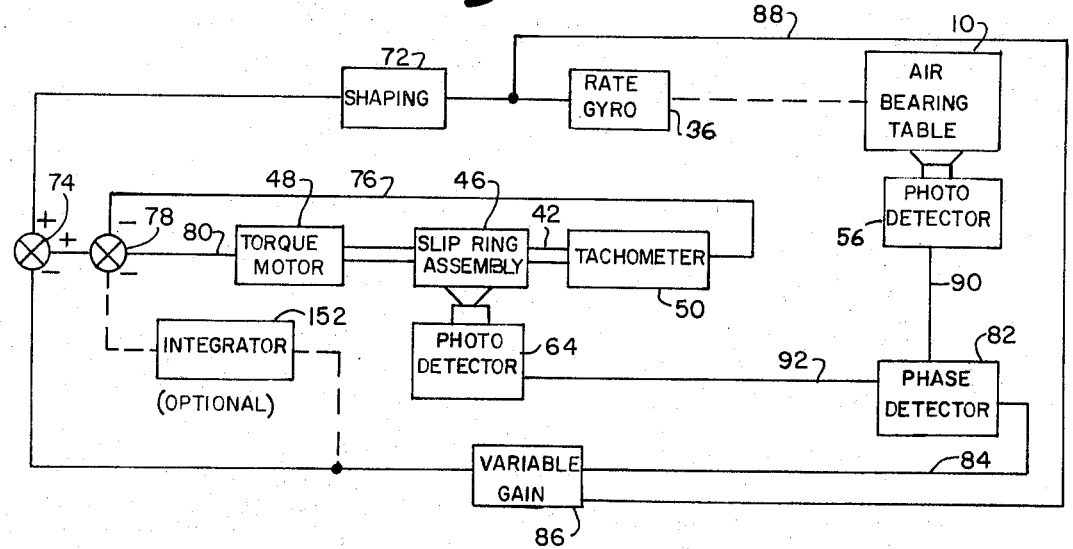
FIG. 2 is a block diagram of a servo system utilized for synchronizing the rotation of a slip ring assembly with an air bearing table.

Referring in more detail to FIG. 2, there is illustrated a block diagram which includes the elements of the servo system 60. As previously mentioned, a rate gyroscope 36 is carried on the air bearing table 10 and generates a signal indicative of the rotation of the air bearing table 10. This signal is fed through a shaping circuit 72 to a summing junction circuit 74. The summing junction circuit 74 is an operational amplifier. The tachometer 50 carried on shaft 42 generates a signal which is fed over lead 76 indicating the rate of rotation of the shaft 42. This signal is fed to summing junction circuit 74. The signal being supplied to the summing junction circuit 74 from the rate gyroscope 36 is compared with the signal being supplied from the tachometer 50 and fed to a summing junction 78 to generate a corrective signal on lead 80 that causes the torque motor 49 to rotate the shaft 42 at substantially the same rate of rotation as the air bearing table 10 rotates. This helps to prevent the wires 40 leading from the brushes 44 of the slip ring assembly from twisting and imparting torque to the air bearing table. One problem encountered with the loop previously described, is that it is not sufficiently accurate to prevent some torque from being applied from the slip ring assembly to the air bearing table. To more accurately synchronize the roation of the air bearing table 10 with the slip ring assembly, a second servo loop is provided.

The second servo loop includes the photo-detector 56 which generates a pulse each time the table makes one revolution and the beam from light-source 54 is interrupted by the bracket 58. This pulse is fed into a phase detector 82. A similar pulse is generated by photo-detector 64 each time the arm 66 interrupts the light beam from the light source 62 because of rotation of shaft 42 of the slip ring assembly. The pulse from photo-detector 64 is also supplied to the phase-detector 82, and a corrective analog signal is produced on lead 84 indicating the phase relation of the two pulses. This analog signal is fed through a variable gain amplifier 86 to the summing junction 74 to produce a voltage which is applied to the torque motor 48. The rotation of the shaft 42 is thus brought into proper phase with the rotation of the air bearing table.

The output of the phase-detector 82 is proportional to the phase relation of pulses from photo-detectors 56 and 64. The gain of the phase-detector 82 is inversly proportional to repetition rate of the pulses. In order to maintain constant gain in the loop, variable gain amplifier 86 is used.

The output of the rate gyro 36 is coupled by means of lead 88 to the variable gain amplifier 86 so that the gain of the variable gain amplifier is directly proportional to the pulse rate and the loop gain therefore is not affected by the speed that the air bearing table 10 is rotating.

Figure 3:
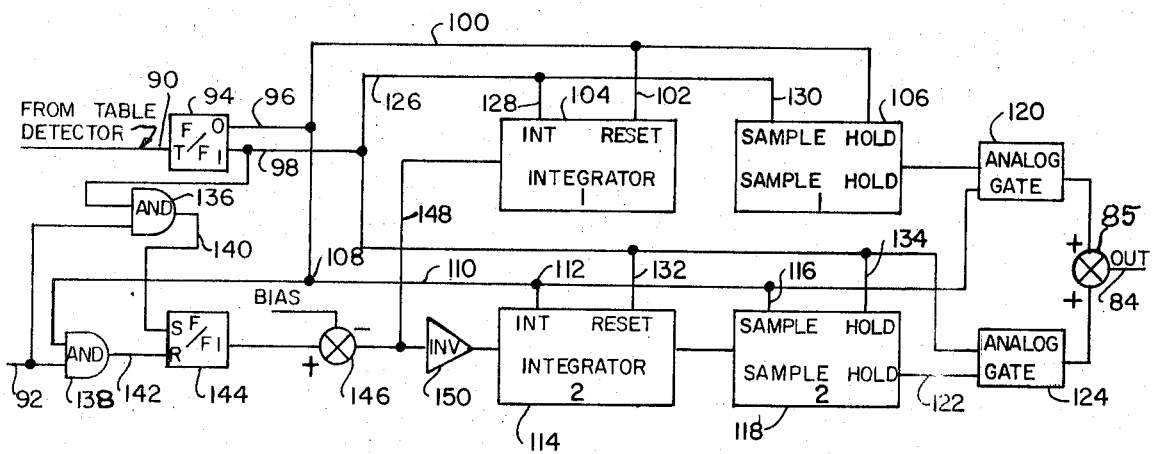
FIG. 3 is a detailed block diagram of a phase locked servo system utilized in the system of FIG. 2.

Referring now to FIG. 3 of the drawings, there is illustrated a detailed block diagram of the phase-detector circuit 82. The circuit includes an input lead 90 coming from the photo-detector 56, and an input lead 92 coming from the photo-detector cell 64. The input lead 90 is fed into a trigger flip-flop 94, which has two outputs 96 and 98, respectively. The output 96 is coupled by means of a lead 100 to a reset input 102 of an integrator 104. It is, also, coupled to a hold input of a sample hold circuit 106. Output lead 96 extends to junction 108 which is coupled by lead 110 to an integrate input 112 of an integrator 114. It is, also, coupled to a sample input 116 of a sample hold circuit 118. The output of the sample hold circuit 106 is connected to one input of an analog AND gate 120, which has its output connected to lead 84 through summing junction 85. Lead 84 is connected to the variable gain amplifier 86. The output of sample hold circuit 118 is connected to an input 122 of another analog AND gate 124 which has its output coupled to output lead 84 through summing junction 85.

The other output 98 of flip-flop 94 is coupled by lead 126 to an integrate input 128 of the integrator 104. It is, also, coupled to the sample input 130 of the sample hold circuit 106. The reset input 132 of the integrator 114 and the hold input 134 of the sample hold circuit 118 are also coupled to the output lead 98 of the flip-flop 94. It is noted that the input lead of analog gate 120 is coupled to lead 110 for receiving a signal from the "zero" output labeled 96 of flip-flop 94. The other input of analog gate 124 is coupled to the "one" output labeled 98 of flip-flop 94.

An AND gate 136 has one input connected to output lead 98 of flip-flop 94 and the other input lead connected to input lead 92 for receiving a signal from the photo-detector 64. An AND GATE 138 has one input coupled to lead 92, and the other lead connected to output lead 96 of flip-flop 94. Outputs 140 and 142, respectively, of AND gates 136 and 138 are coupled to an input of a set-reset flip-flop 144. The "one" output of flip-flop 144 is fed to a summing junction circuit 146. The summing junction circuit has a minus 2.5 volt bias coupled thereto. The output of the summing junction 146 is connected by lead 148 to an input of integrator 104 to be integrated thereby. It is, also, coupled through an inverter 150 to an input of integrator 114 to be integrated thereby when such is activated.

In order to aid in understanding the operation of the phase lock loop circuit illustrated in FIG. 3, assume first that flip-flop 94 and 144 are in the "zero" state. Assume, also, that the rate gyro loop is perfect. These assumptions are made merely to simplify operation explanation. Proper operation of the circuit is not dependent on the validity of these assumptions. If the table is given a constant angular velocity the slip ring assembly follows at the same velocity as air bearing table because of the signal generated by the tachometer being fed back to the summing junction circuit 78 to be compared with the signal from the rate gyro.

If the first pulse generated by the photo-detector 64 associated with the slip ring assembly occurs just momentarily, after the pulse generated by the photo-detector 56, then flip-flop 94 and flip-flop 144 go to the "one" state. When flip-flop 94 is in the "one" state an output is provided on output lead 98, and is fed to the integrate input 128 of the integrator 104, and the sample input of the sample hold circuit 106. It is, also, fed to the reset input 132 of integrator 114 and the hold input 134 of the sample hold circuit 118. The pulse from photo detector 64 passes through AND gate 136 since there is an input on lead 98. This pulse sets flip-flop 144 producing a plus 5 volt signal on its "one" output. This 5 volt signal is summed with a minus 2.5 bias at the summing junction circuit 146, producing a plus 2.5 voltage. This voltage is applied over lead 148 to the integrator 104 to begin integration. Integrator 104 integrates the input signal until the second pulse from the table detector changes flip-flop 94 from the "one" state to the "zero" state. At this time, the sample hold circuit 106 holds the voltage that the integrator had reached. This voltage is applied to an input of analog AND gate 120 which receives a signal from flip-flop 94 when such is in the "zero" state. The AND gate 120 thus allows an analog corrective signal to be applied to the output lead 84. The amplitude of this analog signal is proportional to the phase difference between the pulse produced by the photo-detector 64 associated with the slip ring and the pulse produced by the photo-detector associated with the air bearing table, the amplitude being zero when phase difference is 90°.

When flip-flop 94 is changed from the "one" state to the "zero" state by the second pulse being fed to the phase-detector from the photo-detector cell 56 a signal is applied to the integrator input 112 of integrator 114, and to the sample input 116 of the sample hold circuit 118. The second pulse coming from photo-detector 64, which lags the second pulse from photo-detector cell 56, causes the flip-flop 144 to be triggered off. Therefore, there is a zero voltage at the "one" output of flip-flop 144. Since there is a minus 2.5 bias voltage being applied to the summing junction circuit 146, there is minus 2.5 voltage applied to the inverter 150 which inverts such and feeds it to the input of integrator 114. Integrator 114 integrates this signal and the sample hold circuit 118 samples the output of integrator 114. The integrator 114 continues integrating until the next pulses is applied to the flip-flop 94 which causes the sample-hold circuit to hold the voltage of the integrator 114 and the integrator 114 to be reset. The voltage being held by the sample hold circuit 118 is applied through the analog gate 124 to the output lead 84 and on to the summing junction circuit 78. This signal on output lead 84 causes a bucking voltage to be applied to the torque motor 49 to reduce the velocity of the slip ring assembly. Because the slip ring assembly 46 begins rotating slower than the table after the first and second pulses, the third pulse from the photo-cell 64 associated with the slip ring assembly lags behind the third pulse from photo-cell 56 associated with the table. The output of the sample hold circuit 106 is now less and velocity of shaft 42 increases although, still less than that of the speed of rotation of the table 10. When the output of flip-flop 144 lags the output of flip-flop 94 by 90 electrical degrees, the output of the integrator 104 is "zero" and the shaft 42 of the slip ring assembly 46 and the table 10 rotate the same velocity and are positioned at 180 angular degrees to each other.

Of course, the assumption of a perfect rate gyro loop is not valid. Any errors of scale fact and linearity match between rate gyroscope 36 and the tachometer 50 and the rate loop servo errors result in a phase relation between the rotation of the table 10 and the shaft 42 of the slip ring assembly being other than 180°. If this is objectionable, an optional integrator 152 can be coupled into the circuit of FIG. 2 between the summing junction 78 and the output of the variable gain amplifier 86. The purpose of utilizing the two sets of integrators and sample hold circuits, as shown in FIG. 3, is to produce a smooth operation and a constant voltage on the output lead 84 when correction is required, since one set of integrator and sample hold circuits is used during one-half of the cycle, and the other set is utilized during the other half of the cycle.

The primary purpose of AND gates 136 and 138 are to prevent corrections of more than 180 angular degrees, which could be caused by initial phasing of flip-flop 94 and flip-flop 144 or by a loss of a pulse.

While a preferred embodiment of the invention has been described using specific terms, such description is for illustrative purposes only, and it is to be understood that changes and variations may be made without departing from the spirit or scope of the following claims.

What is claimed is:
1. A system for synchronizing the rotation of a pair of rotating bodies comprising:
 a. a first rotating member,
 b. a second rotatable member,
 c. a rate gyroscope carried by said first rotating member generating a first electrical signal indicative of the rate of rotation of said first rotating member,
 d. a torque motor coupled to said second rotatable member for rotating said second rotatable member,
 e. means coupled to said second rotatable member for generating a second electrical signal indicative of the rate of rotation of said second rotatable member,
 f. a voltage producing means provided for receiving said first and second electrical signals and feeding a corrected voltage to said torque motor causing said torque motor to rotate said second rotabable member at substantially the same rate of rotation as said first rotating member,
 g. a first photo detection means for generating a pulse each time said first rotating member rotates past a reference point,
 h. a second photo detection means for generating a pulse each time said second rotatable member rotates past a reference point, i. a phase detector means coupled to said first and second photo detection means generating an analog signal corresponding to the phase difference between said pulses from said first and second photo detection means, and j. means for coupling said analog signal to said voltage producing means for varying said corrective signal so as to more accurately synchronize the rotation of said second rotatable member with said first rotating member.

2. The system as set forth in claim 1 wherein, a. said rotating member is an air bearing table, and b. said second rotatable member is a slip ring assembly.

3. The system as set forth in claim 2 wherein said slip ring assembly includes:

a. a plurality of stacked rings, b. a rotatable shaft coupled to said torque motor, c. electrical brushes carried by said rotatable shaft engaging said stacked rings, and d. electrical conductors extending from said brushes to said air bearing table for providing electrical paths from said slip ring assembly to said air bearing table.

4. The system as set forth in claim 1 further comprising:

a. a variable gain amplifier coupled between said phase detector means and said voltage producing means for amplifying said analog signal being fed to said voltage producing means.

5. The system as set forth in claim 4 further comprising:

a. means for coupling said first electrical signal from said rate gyroscope to said variable gain amplifier for providing a reference voltage for said variable gain amplifier.

6. The system as set forth in claim 1 wherein:

a. said means coupled to said second rotatable member for generating a second electrical signal is a tachometer.

* * * * *